(12) United States Patent
Ogura

(10) Patent No.: US 8,454,196 B2
(45) Date of Patent: Jun. 4, 2013

(54) OUTDOOR ILLUMINATION LAMP

(75) Inventor: Yoshiaki Ogura, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 214 days.

(21) Appl. No.: 13/059,120

(22) PCT Filed: Sep. 14, 2009

(86) PCT No.: PCT/JP2009/066034
§ 371 (c)(1),
(2), (4) Date: Feb. 15, 2011

(87) PCT Pub. No.: WO2010/032709
PCT Pub. Date: Mar. 25, 2010

(65) Prior Publication Data
US 2011/0141738 A1     Jun. 16, 2011

(30) Foreign Application Priority Data
Sep. 16, 2008  (JP) .................. 2008-235888

(51) Int. Cl.
*F21S 4/00* (2006.01)
*F21V 21/00* (2006.01)
*F21V 19/00* (2006.01)

(52) U.S. Cl.
USPC ..................... 362/249.01; 362/382

(58) Field of Classification Search
None
See application file for complete search history.

(56) References Cited

U.S. PATENT DOCUMENTS

| | | | | |
|---|---|---|---|---|
| 4,748,548 A | * | 5/1988 | Barton | 362/249.01 |
| 4,866,581 A | * | 9/1989 | Targetti | 362/219 |
| 5,027,260 A | * | 6/1991 | Lyons et al. | 362/542 |
| 5,107,408 A | * | 4/1992 | Vernondier | 362/238 |
| 6,070,986 A | | 6/2000 | Yoneda | |
| 2007/0177392 A1 | * | 8/2007 | Grigorik | 362/382 |
| 2008/0037239 A1 | | 2/2008 | Thomas et al. | |
| 2008/0192476 A1 | | 8/2008 | Hiratsuka | |
| 2010/0321930 A1 | | 12/2010 | Watanabe et al. | |

FOREIGN PATENT DOCUMENTS

| | | |
|---|---|---|
| DE | 1131536 B | 6/1962 |
| EP | 2 019 252 A1 | 1/2009 |
| JP | 64-13744 U | 1/1989 |
| JP | 10-21729 A | 1/1998 |

(Continued)

OTHER PUBLICATIONS

Machine Translation of Applicant cited JP2004-200102A published in Jun. 15, 2004.*

*Primary Examiner* — Britt D Hanley
(74) *Attorney, Agent, or Firm* — Birch, Stewart, Kolasch & Birch, LLP

(57) ABSTRACT

An illumination lamp in which a lamp fitting is attached to a support is installed outdoors. Light-emitting portions of the lamp fitting are easily attached, with a small number of components, to such a position as to illuminate a wide area. In order to prevent the attached components from being damaged, the lamp fitting (1) includes the light-emitting portions (2), a casing (10) to which the light-emitting portions are attached and a protective cover (3) which is arranged on the front side of the light-emitting portions and which protects the light-emitting portions. The casing (10) is shaped to have a plurality of attachment surfaces (11A) and (11B) to which the light-emitting portions can be attached to face in a plurality of predetermined directions. In the illumination lamp (ST), the light-emitting portions are easily attached to a predetermined position with a small number of components.

7 Claims, 6 Drawing Sheets

FOREIGN PATENT DOCUMENTS

| | | |
|---|---|---|
| JP | 2003-151320 A | 5/2003 |
| JP | 2004-200102 A | 7/2004 |
| JP | 2005-166426 A | 6/2005 |
| JP | 2007-66658 A | 3/2007 |
| JP | 2007-165051 A | 6/2007 |
| JP | 2007-227305 A | 9/2007 |
| JP | 2008-135381 A | 6/2008 |
| WO | WO 99/39131 A1 | 8/1999 |
| WO | WO 02/16826 A1 | 2/2002 |
| WO | WO 2006/067777 A2 | 6/2006 |

* cited by examiner (a)

(b)

(a)

(b)

OUTDOOR ILLUMINATION LAMP

TECHNICAL FIELD

The present invention relates to an illumination lamp which is installed outdoors, and more particularly relates to an illumination lamp which is configured such that a light-emitting portion is suitable to emit light at wide angles.

BACKGROUND ART

Conventionally, as an illumination lamp installed outdoors such as in a park or along a street, there is known an illumination lamp in which a lamp fitting is arranged in an upper portion of a support to illuminate a lower place and which illuminates a predetermined area below the lamp fitting. In an area, a place or the like where electric power is difficult to obtain, there is also known an illumination lamp which includes an electric power generation member, such as a solar panel or a wind power unit, that utilizes natural energy to generate electric power and a storage battery.

When a lamp fitting needs to be lit to widely illuminate the ground, light is diffused through a protective cover arranged in the front surface of a light-emitting portion included in the lamp fitting, a plurality of light-emitting portions that conduct illumination in predetermined directions are fitted so as to conduct illumination in different directions or another method is used. Hence, for example, a plurality of lamp fittings provided with a light-emitting portion having a large number of light-emitting members (for example, LEDs) that conduct illumination in predetermined directions are prepared, and the lamp fittings are attached with the directions of the illumination included at angles outside the predetermined angle, and thus it is possible to obliquely downwardly illuminate a wide area to produce a wide illumination area.

As a lamp fitting that has a large number of light-emitting members within a casing and that conducts illumination in a predetermined direction, there is a lamp fitting 1D, as shown in FIG. 7, in which a light-emitting portion 2 having a large number of light-emitting members 21 is attached to a flat attachment surface 11D of the casing 10D and in which a protective cover 3 is fitted to its front surface in the direction of illumination. The lamp fittings 1D described above are used; specifically, as shown in FIG. 8, an illumination lamp STB in which two lamp fittings 1D are attached to an upper portion of a support while inclined at predetermined angles is used, and thus different illumination areas H1 are produced. It is therefore possible to illuminate a wide illumination area HA.

With an illumination lamp 1C in which, as shown in FIG. 6, two attachment members 7 having inclined light-emitting portion attachment surfaces are provided on a flat attachment surface 11C of a casing 10C opposite each other such that their light-emitting portions 2 (2A and 2B) face outward, it is possible to illuminate a wide area.

Furthermore, an attempt to attach a large number of light-emitting members to a curved-shaped holder is made to extend an illumination area; there have been disclosed street lamps and illumination lamps in which a large number of light-emitting members are attached to a cylindrical attachment holder that is previously divided into two halves so as to extend an illumination area. (for example, see patent document 1).

CITATION LIST

Patent Literature
Patent document 1: JP-A-2003-151320

SUMMARY OF INVENTION

Technical Problem

When a lamp fitting that conducts illumination in a predetermined direction is used to produce a wide illumination area, a plurality of lamp fittings that conduct illumination in a plurality of directions need to be used and this is uneconomical. Even when attachment members having, within a casing, light-emitting portion attachment surfaces that are each inclined outward are used, it is necessary to use attachment members other than the casing, and this is uneconomical. Moreover, since the number of steps of fitting a plurality of attachment members is increased, this is undesired.

Hence, in a lamp fitting in which a light-emitting portion is fitted into a casing and a protective cover is fitted to its front portion in the direction of illumination, it is required to reduce the number of components used and illuminate a predetermined wide angular area. Furthermore, it is preferable that the light-emitting portion and the protective cover be easily attached to the casing, and that a function be stably achieved for a long period of time by preventing damage.

In view of the foregoing problems, the present invention has an object to provide an illumination lamp which has a support and a lamp fitting attached to the support, in which a light-emitting portion of the lamp fitting is easily attached, with a small number of components, to a position where a wide area is illuminated and in which attached components are prevented from undergoing damage.

Solution to Problem

To achieve the above object, according to the present invention, there is provided an illumination lamp including: a support; and a lamp fitting attached to the support. In the illumination lamp, the lamp fitting includes light-emitting portions, a casing to which the light-emitting portions are attached and a protective cover which is arranged in a front side of the light-emitting portions and which protects the light-emitting portions, and the casing is shaped to have a plurality of attachment surfaces to which the light-emitting portions can be attached to face in a plurality of predetermined directions.

Since, in this configuration, the light-emitting portions are fitted to the attachment surfaces previously included in the casing, the attachment surfaces are previously formed in such a direction as to illuminate a wide area, and thus it is possible to obtain an illumination lamp that illuminates a wide area without the user of another component for obliquely attaching the light-emitting members. Moreover, since the protective cover is fitted to the front side of the light-emitting members, it is possible to prevent the light-emitting members from being damaged.

In the illumination lamp of the present invention configured as described above, the casing is formed by extrusion materials such that the attachment surfaces are previously formed. With this configuration, it is possible to integrally mold the casing having the attachment surfaces and thereby produce the casings, and it is also possible to produce a large number of casings having a predetermined shape.

In the illumination lamp of the present invention configured as described above, an insertion groove into which the protective cover is fitted is provided in the casing, and a contact surface close to the protective cover is formed in a boundary portion between the attachment surfaces. With this configuration, it is possible to fit the protective cover into position simply by inserting the protective cover into the insertion grooves of the casing. Since the contact surface is formed in the boundary portion between the attachment surfaces, even when the protective cover is pressed inside, the contact surface serves as a contact portion to reduce a shock. It is therefore possible to prevent the protective cover from being damaged.

In the illumination lamp of the present invention configured as described above, the casing is formed by extrusion materials such that the attachment surfaces, the insertion groove and the contact surface are previously formed. With this configuration, it is possible to integrally mold the casing having the attachment surfaces, the insertion groove and the contact surface and thereby produce the casings, and it is also possible to produce a large number of casings having a predetermined shape.

In the illumination lamp of the present invention configured as described above, the casing is formed into a hollow frame member such that lower surfaces of the casing are M-shaped in cross section and an upper surface of the casing is rounded in a shape of an umbrella, a center portion of the M-shaped lower surfaces is the boundary portion, the lower surfaces that are upward inclined from the boundary portion in opposite direction are a first attachment surface and a second attachment surface, the light-emitting portions are fitted to these two attachment surfaces, these two light-emitting portions emit light downward at wide angles, lower surfaces that are outside the attachment surfaces and that are downward inclined are light shielding surfaces, a coupling plate couples the lower surfaces and the upper surface within the hollow frame member, a center coupling plate couples a lower surface corresponding to the boundary portion and the upper surface, a right shoulder coupling plate and a left shoulder coupling plate that couple the lower surfaces that are M-shaped in cross section and that corresponds to two shoulder portions and the upper surface and the contact surface is formed in a lower portion of the center coupling plate. With this configuration, it is possible to form an illumination lamp that illuminates a wide area by fitting the light-emitting portions to the first and second attachment surfaces. Even when the casing is hollow, since the center coupling plate and the left and right shoulder coupling plates are included, the casing having a strong frame member and high strength is provided. Furthermore, since the contact surface is formed in the lower portion of the center coupling plate, the contact surface engages with the approximate center portion of the protective cover, and thus it is possible to effectively prevent the protective cover form being deformed.

In the illumination lamp of the present invention configured as described above, the casing is formed by extrusion materials such that the attachment surfaces, the insertion groove, the coupling plate and the contact surface are previously formed. With this configuration, it is possible to integrally mold the casing having the lower surfaces that are M-shaped in cross section, the umbrella-shaped upper surface, the center coupling plate, the left and right shoulder coupling plates and the attachment surfaces and thereby produce the casings, and it is also possible to produce a large number of casings having a predetermined shape.

In the illumination lamp of the present invention configured as described above, the light-emitting portions are planar light-emitting portions in which a plurality of light-emitting members are fitted to substrates, and substrate fitting portions into which the substrates are fitted are previously formed on the attachment surfaces. With this configuration, it is possible to fit the substrate including the light-emitting members to a predetermined position of the casing with a single motion, and thus it is possible to easily attach the light-emitting portions.

Advantageous Effects of Invention

According to the present invention, there is provided an illumination lamp in which the lamp fitting includes light-emitting portions, a casing to which the light-emitting portions are attached and a protective cover which is arranged in a front side of the light-emitting portions and which protects the light-emitting portions, and the casing is shaped to have a plurality of attachment surfaces to which the light-emitting portions can be attached to face in a plurality of predetermined directions. It is therefore possible to obtain an illumination lamp in which the light-emitting portions are easily attached, with a small number of components, to a predetermined position without the use of another component for obliquely attaching the light-emitting portions and which prevents the attached light-emitting portions from being damaged.

BRIEF DESCRIPTION OF DRAWINGS

FIG. 5(a) is a side cross-sectional view, FIG. 5(b) is a front view and FIG. 5(c) is a side view of an example including a solar panel;

DESCRIPTION OF EMBODIMENTS

Embodiments of the present invention will be described below with reference to the accompanying drawings. The same component members are identified with like symbols, and their detailed description will be omitted as appropriate.

Figure 5:
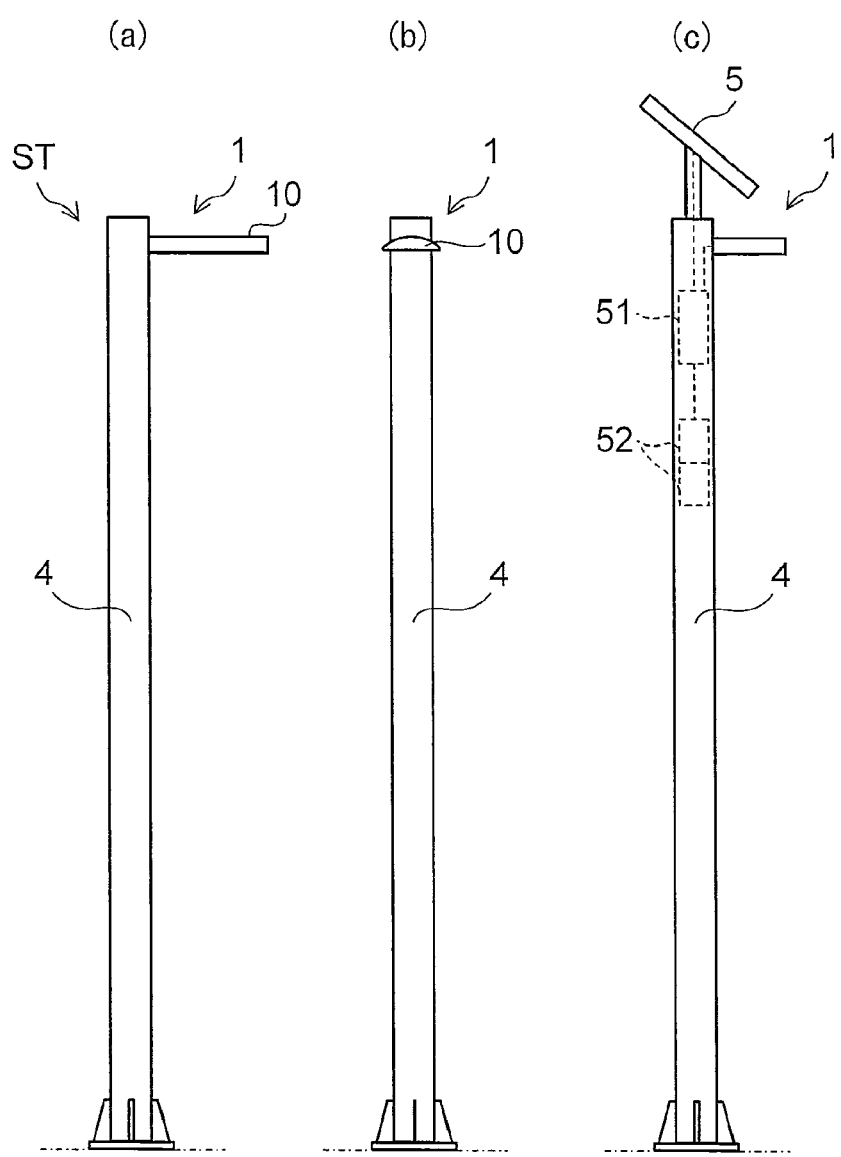
[FIG. 5] A diagram showing an example of the illumination lamp according to the present invention.
Figure 6:
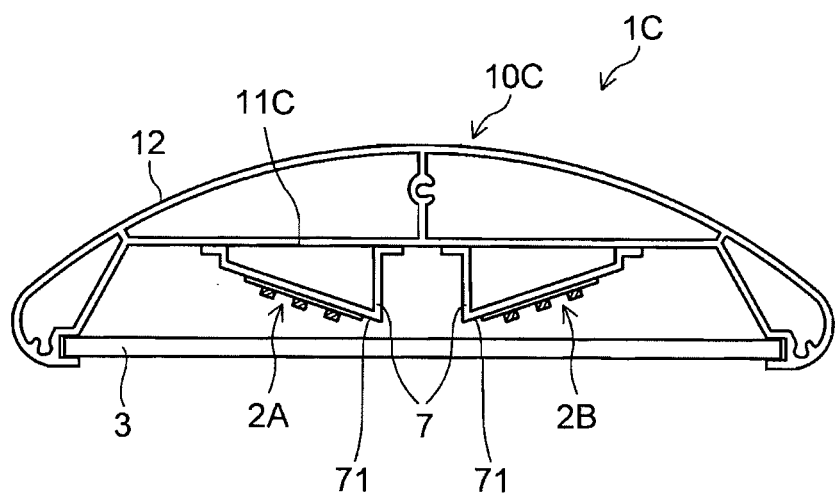
[FIG. 6] A cross-sectional view showing an example of a conventional lamp fitting having two light-emitting portions.
Figure 7:
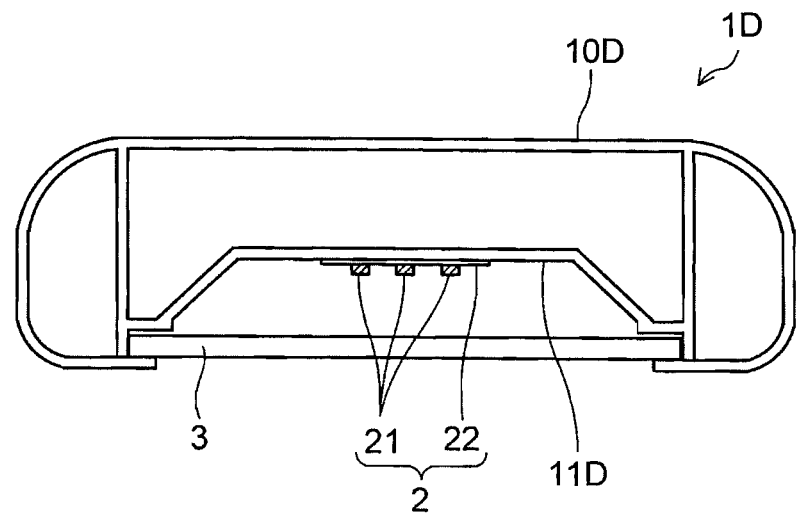
[FIG. 7] A cross-sectional view showing another example of a conventional lamp fitting having one light-emitting portion.
Figure 8:
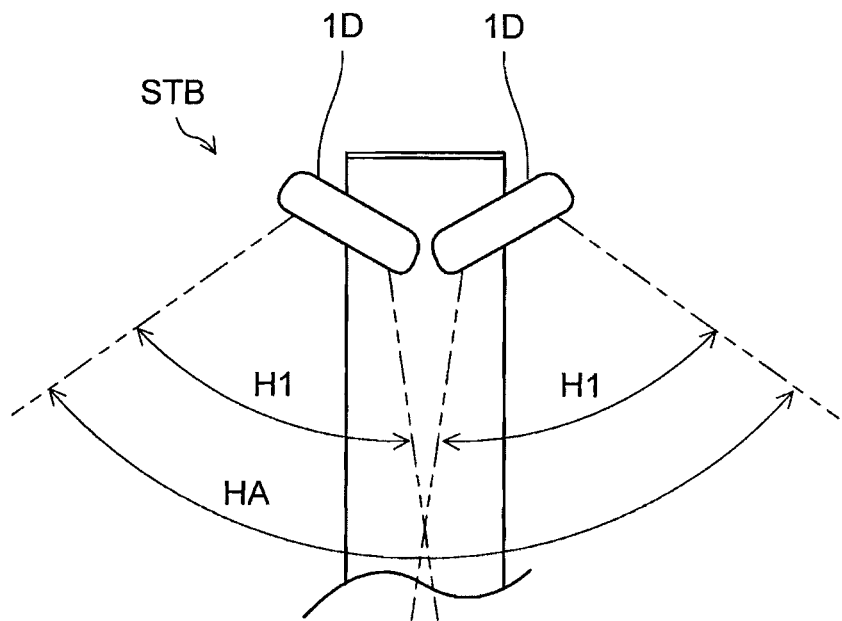
[FIG. 8] An enlarged view of main portions of the illumination lamps using the lamp fitting of FIG. 7.

As shown in FIGS. 5(a) and 5(b), an illumination lamp ST according to the present invention has a lamp fitting 1 on a support 4, is installed outdoors such as in a part or along a street and illuminates a predetermined lower area by lighting the lamp fitting 1 arranged in an upper portion of the support.

When electric power is easily available, as electric power supplied to the lamp fitting 1, general household electric power or commercial electric power can be used. However, when the illumination lamp ST is installed in an area, a place or the like where electric power is difficult to obtain, it can be configured as a self-generation illumination lamp which includes an electric power generation member that utilizes natural energy such as solar energy or wind energy to generate electric power and a storage battery. For example, as shown in FIG. 5(c), the illumination lamp can be configured such that a solar panel 5 is provided on the top portion of the support 4, and electrical components such as a storage battery 52 and a control substrate 51 are provided within the support 4; electric power generated during the daytime is stored, and thus illumination is conducted at night time.

Figure 1:
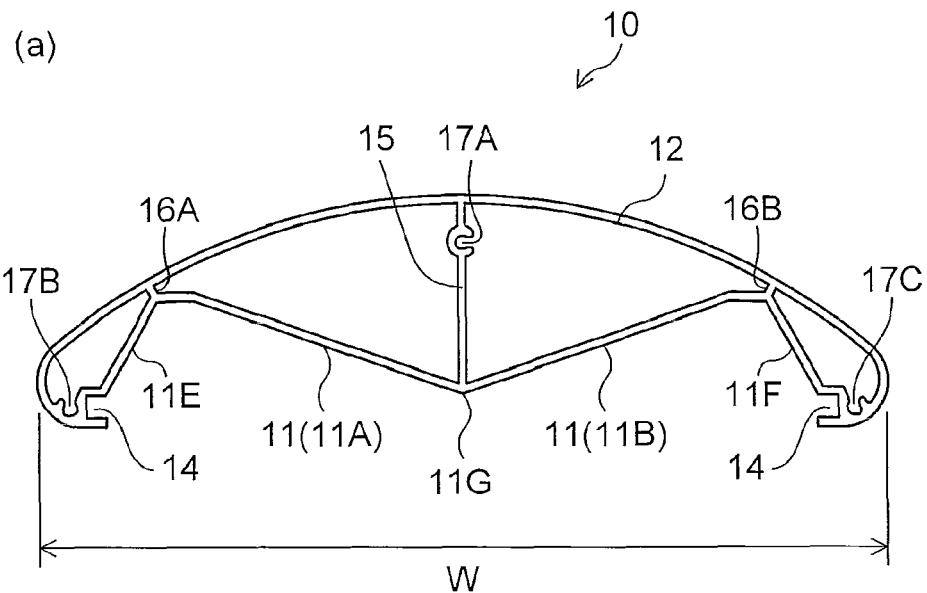
[FIG. 1] A diagram showing a casing included in an illumination lamp according to the present invention; FIG. (a) is an enlarged cross-sectional view, and FIG. (b) is a plan view.
Figure 1:
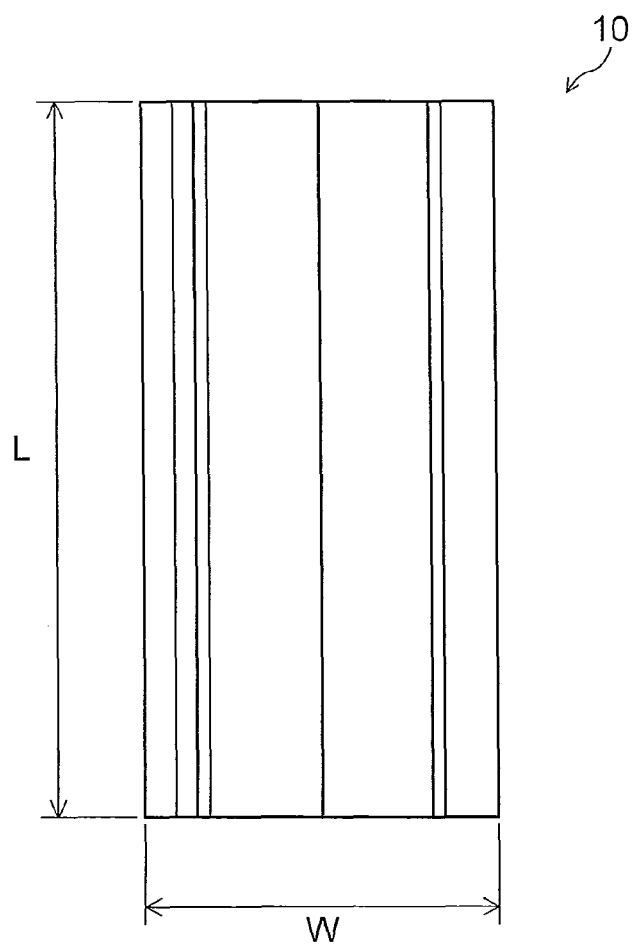
Figure 2:
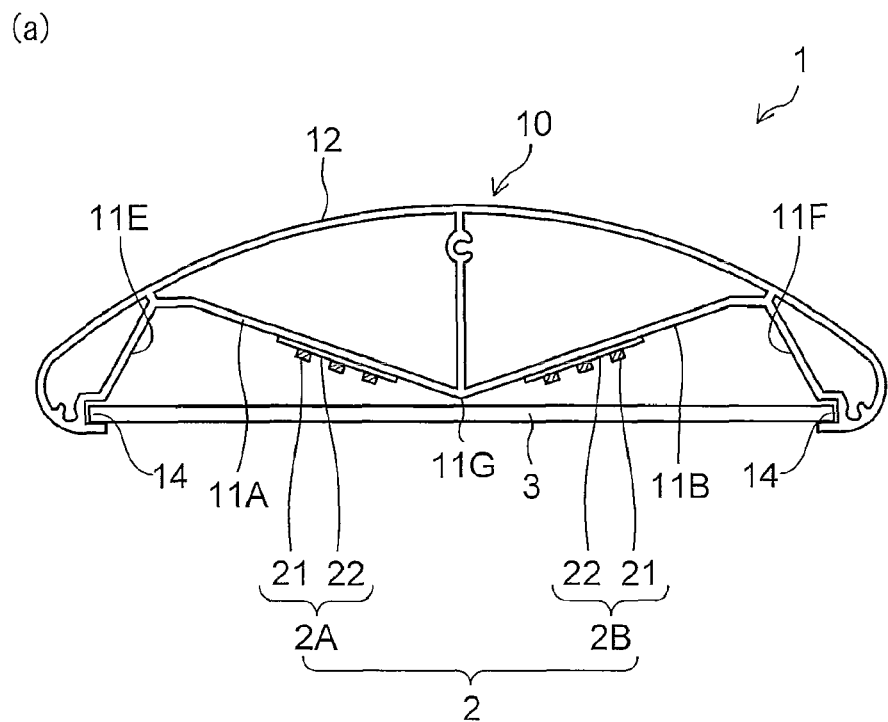
[FIG. 2] A diagram showing a lamp fitting included in the illumination lamp according to the present invention; FIG. (a) is a cross-sectional view in a first embodiment, and FIG. (b) is a cross-sectional view in a second embodiment.
Figure 2:
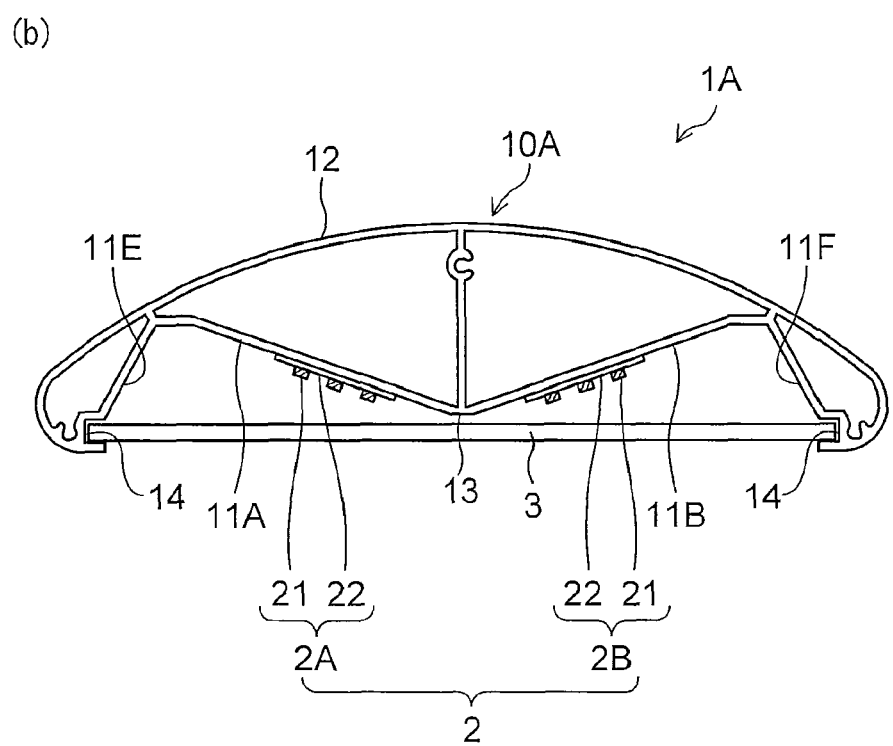

The lamp fitting 1 of the present embodiment will now be described with reference to FIGS. 1 to 4. As shown in FIG. 2(a), the lamp fitting 1 includes a casing 10, light-emitting portions 2 (2A and 2B) and a protective cover 3. Each of the light-emitting portions 2 (2A and 2B) has a plurality of light-emitting members 21 fitted to a substrate 22 and they are integrally configured as planar light-emitting portions. As the light-emitting members 21, LED light-emitting members that consume low electric power and have a high light-emission brightness are suitable; with the LED light-emitting members, it is possible to illuminate a park, a street or the like that is located outdoors at night time with low electric power consumption.

The protective cover 3 is a cover that covers and protects the light-emitting portions 2; the protective cover 3 is a transparent or translucent cover that is arranged on the front side of the light-emitting portions 2. The casing 10 is integrally formed such that the light-emitting portions 2 (2A and 2B) and the protective cover 3 are fitted, and a plurality of attachment surfaces 11 that are a first attachment surface 11A to which the light-emitting portion 2A is attached and a second attachment surface 11B to which the light-emitting portion 2B is attached are previously formed.

The attachment surfaces 11 are attachment surfaces that direct directions in which the light-emitting portions emit light in any direction, and can illuminate a wide area without use of another component for obliquely attaching the light-emitting members. The attachment surfaces 11 that are previously inclined at predetermined angles are provided in the casing 10, and thus it is possible to configure the illumination lamp that can illuminate a predetermined area.

In order to illuminate a wide area in the lower portion of the lamp fitting 1, the two light-emitting portions 2A and 2B are preferably inclined at predetermined angles to face outward; a boundary portion between the two light-emitting portions 2A and 2B is regarded as a lower side and the light-emitting portions on both sides of the boundary portion are inclined opposite each other to face the outside of the boundary portion, and thus it is possible to illuminate a wide area in the lower portion of the lamp fitting 1. The boundary portion is shaped horizontally, and another light-emitting portion may be provided on its horizontal portion; it is possible to fit a light-emitting portion to each of two or more attachment surfaces. The two light-emitting portions 2A and 2B are simply inclined at predetermined angles to face outward, and thus the lower portion of the lamp fitting 1 is satisfactorily illuminated at wide angles Furthermore, preferably, insertion grooves for attaching the protective cover 3 are previously provided in the casing 10; the casing 10 will be described in more details with reference to FIG. 1.

As shown in FIG. 1(a), the casing 10 is a hollow frame member in which its lower surfaces 11 are M-shaped in cross section and its upper surface 12 is rounded in the shape of an umbrella. The center portion of the lower surfaces 11 is referred to as the boundary portion 11G, and the lower surfaces 11 are upward inclined from the boundary portion 11G in opposite directions; the lower surfaces 11 are referred to as the first attachment surface 11A and the second attachment surface 11B, respectively.

As described above, the light-emitting portions 2 (2A and 2B) are fitted to the two attachment surfaces, which are the first attachment surface 11A and the second attachment surface 11B, and these two light-emitting portions 2A and 2B conduct illumination in a downward direction at wide angles. Lower surfaces that are located outside the attachment surfaces and are downward inclined are used as light shielding surfaces 11E and 11F such that illumination light is not diffused laterally but travels downward. As a coupling plate that couples the lower surfaces 11 and the upper surface 12 within the hollow frame member, there are provided: a center coupling plate 15 that couples the lower surface corresponding to the boundary portion 11G and the upper surface; and a right shoulder coupling plate 16A and a left shoulder coupling plate 16B that couple the lower surfaces that are M-shaped in cross section corresponding to two shoulder portions and the upper surface. Consequently, the strength of the frame member is enhanced.

The casing 10 configured as described above can be integrally formed by extrusion materials. When the casing 10 is an extrusion, the casing 10, which includes the lower surfaces 11 that have the attachment surfaces 11A and 11B and that are M-shaped in cross section, the umbrella-shaped upper surface 12, the center coupling plate 15 and the left and right shoulder coupling plates 16A and 16B, and which is a hollow frame member, can be produced by integrally molding the casing 10. Since it is integrally extruded, it is possible to produce a large number of casings that have a predetermined shape and excellent frame strength.

When the material is an aluminum extrusion material, it is desirably possible to produce the casing that has excellent design and appearance and to obtain the lamp fitting 1 that is compact and looks good. Furthermore, when the casing is an extrusion material of aluminum, a groove portion is easily formed that is continuous in a longitudinal direction within the hollow member and that has predetermined dimensions; it is possible to easily produce a large number of casings 10 by producing a long extrusion having a predetermined width dimension W and thereafter cutting it to a desired length L shown in FIG. 1(b). As described above, since the groove portion, the coupling plate and the like that are continuous in a length direction are formed, the casing 10 has excellent strength as a frame. Moreover, corrosion resistance is enhanced by anodizing or coating the surface.

Reference numerals 17A, 17B and 17C are screw fixing portions; they are utilized when lids are attached to opening portions in the side surfaces to close the opening portions. Hence, since, as viewed from outside, the lamp fitting 1 is composed of the upper surface 12 formed by extrusion, the lower surface of the protective cover 3 and the lids that are fitted to left and right end portions, it is possible to produce the lamp fitting having an excellent design by fitting the lids, which look good.

The lamp fitting formed by fitting the light-emitting portions and the protective cover to the casing will now be described with reference to FIGS. 2 and 3.

As shown in FIG. 2(a), the lamp fitting 1 is formed by fitting the light-emitting portions 2 (2A and 2B) and the protective cover 3 to the casing 10 described above, and the light-emitting portion 2A is attached to the first attachment surface 11A and the light-emitting portion 2B is attached to the second attachment surface 11B. The protective cover 3 is fitted by being inserted into the insertion grooves 14. Here, since the boundary portion 11G is close to the protective cover 3, when an external force is applied to the protective cover 3 and the protective cover 3 is pressed from outside to inside, the boundary portion 11G comes into contact with the protective cover 3 that is bent inside, and this results in the formation of a shock absorber. Hence, a flat contact surface is formed in a portion where they come into contact, and thus the protective cover 3 comes into contact with the contact surface, with the result that it is possible to more effectively prevent the cover from being damaged. In FIG. 2(b), a casing 10A is shown in which the contact surface 13 is fowled at the boundary portion 11G.

Since the casing 10A is configured such that the contact surface 13 is formed in the lower portion of the center coupling plate, even when the protective cover 3 is pressed inside, the contact surface 13 serves as a contact portion to reduce a shock more effectively. It is therefore possible to produce a lamp fitting 1A that prevents the protective cover 3 from being damaged.

Figure 3:
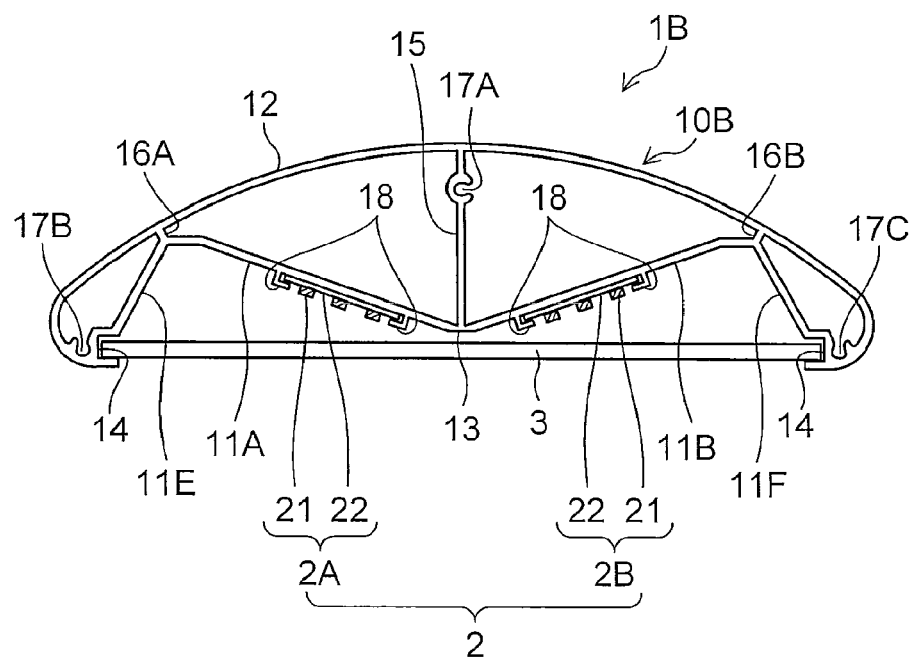
[FIG. 3] A cross-sectional view of a lamp fitting according to a third embodiment.
Figure 4:
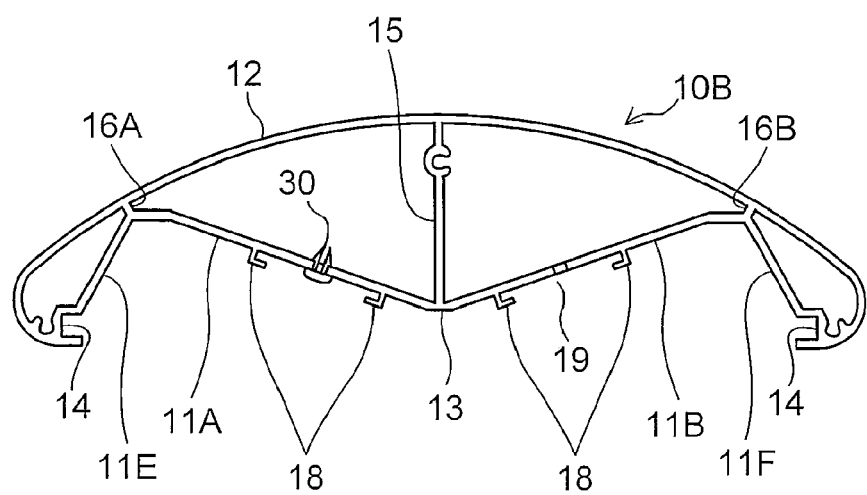
[FIG. 4] A cross-sectional view of a casing included in the lamp fitting of FIG. 3.

In a casing 10B shown in FIG. 3, in addition to the contact surface 13, substrate fitting portions 18 to which the substrates 22 for the light-emitting portions 2 are fitted are previously formed on the attachment surfaces 2. With this configuration, it is possible to fit the substrate 22 including the light-emitting members 21 to a predetermined position of the casing 10B with a single motion, and thus it is possible to easily attach the light-emitting portions 2.

A cross-sectional view of the casing 10B described above is shown in FIG. 4. As with the casing 10 described above, the casing 10B includes: the upper surface 12 that is rounded in the shape of an umbrella; the first attachment surface 11A and the second attachment surface 11B that are inclined at predetermined angles to illuminate a predetermined lower area; the light shielding surfaces 11E and 11F; the center coupling plate 15 and the left and right shoulder coupling plates 16A and 16B. In addition to the contact surface 13, the substrate fitting portions 18 are integrally molded with the first and second attachment surfaces.

The substrate fitting portion 18 is provided with a pair of L-shaped hook portions that are arranged opposite each other, is shaped such that the substrate 22 of the light-emitting portions 2 can be inserted into the substrate fitting portions 18 and is configured such that an insertion pin 30 can be fitted to specify a position where the substrate 22 to be inserted is fixed. For example, insertion holes 19 are provided in appropriate positions located forward and backward in a direction in which the substrate 22 to be fitted is inserted, and thus it is possible to arrange the light-emitting portions 2 in predetermined positions.

Since, as described above, the casing 10B is formed into the hollow frame member that includes the upper surface 12 rounded in the shape of an umbrella and the lower surfaces 11 that are bent to be M-shaped in cross section, and the center coupling plate 15 and the left and right shoulder coupling plate 16A and 16B are included into the hollow frame member, the casing 10B has strength as a frame member. Hence, a lamp fitting 1B in which the light-emitting portions 2 are fitted to the lower surfaces 11 and the protective cover 3 is further fitted also has high strength as a frame member.

The light-emitting portions 2 and the protective cover 3 can be fitted into the previously fanned groove portions, and thus it is possible to fit each of them with a single motion, with the result that the attachment operation is easily performed.

Furthermore, since the light-emitting portions and the protective cover 3 that have been fitted are easily removed, it is possible to easily replace components and easily perform maintenance.

When the illumination lamp including the solar panel is used, electric power can be generated with natural energy, and thus it is possible to arrange the illumination lamp in an area or a place where electric power is difficult to obtain. Furthermore, it is possible to use wind power generation as a power generation member for generating electric power with natural energy; when wind power generation is employed, the solar panel 5 described above is preferably replaced with a wind turbine generation device. Alternatively, it is possible to use both the solar panel and the wind turbine generation device; when it is sunny with no wind, the solar panel is used whereas, when it is windy, the wind turbine generation device is used. Consequently, it is possible to provide an all-weather illumination lamp.

As described above, according to the present invention, in the illumination lamp, the lamp fitting includes the light-emitting portions, the casing to which the light-emitting portions are attached and the protective cover which is arranged in the front side of the light-emitting portions to protect the light-emitting portions, and the casing is shaped to have a plurality of attachment surfaces to which the light-emitting portions can be attached to face in a plurality of predetermined directions. It is therefore possible to obtain the illumination lamp in which the light-emitting portions and the protective cover are easily attached, with a small number of components, to a predetermined position to conduct illumination at wide angles without use of another component for obliquely attaching the light-emitting members.

Since the insertion grooves into which the protective cover is fitted are provided in the casing, and the contact surface close to the protective cover is formed in the boundary portion between the attachment surfaces, it is easy to fit the casing; even when the protective cover is pressed inside, the contact surface serves as the contact portion to reduce a shock. It is therefore possible to prevent the protective cover from being damaged.

When the casing is a hollow extrusion material of aluminum, it is possible to produce the lamp fitting that has excellent design and appearance, and it is desirably possible to obtain the lamp fitting 1 that is compact and looks good. Furthermore, when the casing is an extrusion of aluminum, the groove portion and a division plate that have predetermined dimensions are easily formed within the casing; it is possible to easily produce a large number of casings by producing a long extrusion where a hollow frame member having a predetermined shape is formed and cutting it to a desired length.

Industrial Applicability

Since the illumination lamp of the present invention can illuminate a wide area with a small number of components and it is easy to assembly the illumination lamp, the illumination lamp can be suitably applied as an illumination lamp that is installed outdoors to illuminate a wider area.

Reference Signs List
1 Lamp fitting
2 Light-emitting portion
3 Protective cover
4 Support
5 Solar panel
10 Casing
11 Lower surface
11A First attachment surface
11B Second attachment surface
12 Upper surface
13 Boundary portion
14 Insertion groove
21 Light-emitting member (light-emitting portion)
22 Substrate (light-emitting portion)
ST Illumination lamp

The invention claimed is:
1. An outdoor illumination lamp comprising:
a support; and
a lamp fitting attached to the support,
wherein the lamp fitting includes light-emitting portions, a casing to which the light-emitting portions are attached and a protective cover which is arranged in a front side of the light-emitting portions and which protects the light-emitting portions, and lower surfaces of the casing are M-shaped in cross section, and the casing is shaped to have a plurality of attachment surfaces to which the light-emitting portions can be attached to face in a plurality of predetermined directions and the attachment surfaces include, with a center portion of the lower surfaces M-shaped in cross section being a boundary portion, two attachment surfaces in which the lower surfaces that are upward inclined from the boundary portion in opposite directions are a first attachment surface and a second attachment surface, the light-emitting portions are fitted to the first and second attachment surfaces, the light-emitting portions emit light downward at wide angles, and the lower surfaces that are outside the attachment surfaces and that are downward inclined are light shielding surfaces.

2. The outdoor illumination lamp of claim 1, wherein the casing is formed by extrusion materials such that the attachment surfaces are previously formed.

3. The outdoor illumination lamp of claim 1, wherein an insertion groove into which the protective cover is fitted is provided in the casing, and a contact surface close to the protective cover is formed in the boundary portion between the attachment surfaces.

4. The outdoor illumination lamp of claim 3, wherein the casing is formed by extrusion materials such that the attachment surfaces, the insertion groove and the contact surface are previously formed.

5. The outdoor illumination lamp of claim 3, wherein the casing is formed into a hollow frame member such that lower surfaces of the casing are M-shaped in cross section and an upper surface of the casing is rounded in a shape of an umbrella, a coupling plate coupling the lower surfaces and the upper surface within the hollow frame member are provided, and, as the coupling plate, a center coupling plate coupling a lower surface corresponding to the boundary portion and the upper surface, a right shoulder coupling plate and a left shoulder coupling plate that couple the lower surfaces that are M-shaped in cross section and that corresponds to two shoulder portions and the upper surface are provided, and the contact surface is formed in a lower portion of the center coupling plate.

6. The outdoor illumination lamp of claim 5, wherein the casing is formed by extrusion materials such that the attachment surfaces, the insertion groove, the coupling plate and the contact surface are previously formed.

7. The outdoor illumination lamp of claim 6, wherein the light-emitting portions are planar light-emitting portions in which a plurality of light-emitting members are fitted to substrates, and substrate fitting portions into which the substrates are fitted are previously formed on the attachment surfaces.

* * * * *